US009612359B2

(12) United States Patent
Holland et al.

(10) Patent No.: US 9,612,359 B2
(45) Date of Patent: Apr. 4, 2017

(54) GENERATION OF FRACTURE NETWORKS USING SEISMIC DATA

(71) Applicants: Marc Holland, Mainz (DE); Wouter E. Van Der Zee, Voorburg (NL); Xiaomei Zhang, Utrecht (NL)

(72) Inventors: Marc Holland, Mainz (DE); Wouter E. Van Der Zee, Voorburg (NL); Xiaomei Zhang, Utrecht (NL)

(73) Assignee: BAKER HUGHES INCORPORATED, Houston, TX (US)

(*) Notice: Subject to any disclaimer, the term of this patent is extended or adjusted under 35 U.S.C. 154(b) by 625 days.

(21) Appl. No.: 13/916,143

(22) Filed: Jun. 12, 2013

(65) Prior Publication Data
US 2014/0372094 A1    Dec. 18, 2014

(51) Int. Cl.
G06G 7/48        (2006.01)
G01V 11/00       (2006.01)
E21B 43/26       (2006.01)
E21B 47/022      (2012.01)
G01V 1/28        (2006.01)

(52) U.S. Cl.
CPC ........... G01V 11/00 (2013.01); E21B 43/26 (2013.01); E21B 47/02208 (2013.01); G01V 1/288 (2013.01)

(58) Field of Classification Search
CPC .. G01V 11/00; G01V 1/288; E21B 47/02208; E21B 43/26
USPC ............................................ 703/9–10; 702/6
See application file for complete search history.

(56) References Cited

U.S. PATENT DOCUMENTS

| 6,151,555 A | 11/2000 | Van Bemmel et al. |
| 2004/0008580 A1 | 1/2004 | Fisher et al. |
| 2005/0273266 A1 | 12/2005 | Nickel |
| 2008/0247269 A1 | 10/2008 | Chen |
| 2008/0249906 A1 | 10/2008 | Landris, Jr. et al. |
| 2009/0125240 A1 | 5/2009 | Den Boer et al. |
| 2010/0256964 A1 | 10/2010 | Lee et al. |

(Continued)

FOREIGN PATENT DOCUMENTS

| WO | 0140623 A1 | 6/2001 |
| WO | 2011077227 A2 | 6/2011 |

(Continued)

OTHER PUBLICATIONS

Borgos et al., "Analysis of dynamic fracture behavior using 4D seismic data", SEG Houston 2009 International Exposition and Annual Meeting, pp. 3770-3774.

(Continued)

Primary Examiner — Eunhee Kim
(74) Attorney, Agent, or Firm — Cantor Colburn LLP

(57) ABSTRACT

An embodiment of a method for constructing a fracture network includes: receiving seismic data collected from a stimulation operation in an earth formation, the seismic data including seismic event data including a first seismic event associated with a first time increment and a second seismic event associated with a subsequent second time increment; and constructing a fracture network model. The model is constructed by: constructing an initial portion of the model based on the first seismic event; and subsequently updating the initial portion of the model based on the second seismic event.

19 Claims, 7 Drawing Sheets

(56) References Cited

U.S. PATENT DOCUMENTS

| | | | |
|---|---|---|---|
| 2010/0307755 A1* | 12/2010 | Xu | E21B 43/26 166/308.1 |
| 2011/0029293 A1 | 2/2011 | Petty et al. | |
| 2011/0120702 A1* | 5/2011 | Craig | E21B 43/26 166/250.1 |
| 2011/0125476 A1 | 5/2011 | Craig | |
| 2012/0092959 A1 | 4/2012 | Taylor et al. | |
| 2012/0160481 A1 | 6/2012 | Williams | |
| 2012/0290211 A1 | 11/2012 | Murphy et al. | |
| 2012/0318500 A1 | 12/2012 | Urbancic et al. | |
| 2013/0081805 A1 | 4/2013 | Bradford et al. | |
| 2013/0140020 A1* | 6/2013 | Suarez-Rivera | E21B 43/26 166/250.1 |
| 2013/0144532 A1* | 6/2013 | Williams | G01V 1/50 702/11 |
| 2013/0304437 A1* | 11/2013 | Ma | G06F 17/5009 703/2 |
| 2014/0052377 A1 | 2/2014 | Downie | |
| 2014/0188447 A1 | 7/2014 | Venkataraman et al. | |
| 2014/0200811 A1 | 7/2014 | Wuestefeld et al. | |
| 2014/0305638 A1* | 10/2014 | Kresse | E21B 43/267 166/250.1 |
| 2015/0006082 A1 | 1/2015 | Zhang et al. | |
| 2015/0006124 A1 | 1/2015 | Zhang et al. | |
| 2015/0285933 A1 | 10/2015 | Grealy | |

FOREIGN PATENT DOCUMENTS

| | | |
|---|---|---|
| WO | 2012141720 A1 | 10/2012 |
| WO | 2013028237 A1 | 2/2013 |

OTHER PUBLICATIONS

Bachmann et al., "Influence of pore-pressure on the event-size distribution of induced earthquakes", GeoPhysical Research Letters, vol. 39, L09302, doi:10.129/2012GL051480, 2012, 7 pages.

Brune, "Tectonic Stress and the Spectra of Seismic Shear Waves from Earthquakes", Journal of Geophysical Research, vol. 75, No. 26, Sep. 10, 1970, pp. 4997-5009.

Cipolla et al, "Engineering Guide to the Application of Microseismic Interpretations", SPE 152165, SPE Hydraulic Fracturing Technology Conference, The Woodlands, Texas, USA, Feb. 6-8, 2012, 24 pages.

Gutenberg et al., "Earthquake Magnitude, Intensity, Energy, and Acceleration", Bulletin of the Seismological Society of America, vol. 32, No. 3, Jul. 1942, pp. 163-190.

Hanks et al., "A Moment Magnitude Scale", Journal of Geophysical Research, vol. 84, No. B5, May 10, 1979, pp. 2348-2350.

Kanamori et al., "Theoretical basis of Some Empirical Relatiosn in Seismology", Bulletin of the Seismological Society of America, vol. 65, No. 5, Oct. 1975, pp. 1073-1095.

Madariaga, "Dynamics of an Expanding Circular Fault", Bulletin of the Seismological, Society of America, vol. 66, No. 3, Jun. 1976, pp. 639-666.

McGarr, "Observations Constraining Near-Source Ground Motion Estimated from Locally Recorded Seismograms", Journal of Geophysical Research, vol. 96, No. B10, Sep. 10, 1991, pp. 16,495-508.

Minson et al, "Seismically and geodetically determined nondouble-couple source mechanisms from the 2000 Miyakejima volcanic earthquake swarm", Journal of Geophysical Research, vol. 112, B10308, doi: 10.1029/2006JB004847, 2007, 20 pages.

Muller, "Volume Change of Seismic Sources from Moment Tensors", Bulletting of the Seismological Society of America, 91, 4, pp. 880-884, Aug. 2001.

Woessner, et al., "Assessing the Quality of Earthquake Catalogues: Estimating the Magnitude of Completeness and Its Uncertainty", Bulleting of the Seismological Society of America, vol. 95, No. 2, pp. 684-698, Apr. 2005, doi: 10.1785/0120040007.

Bourne, et al.; "A Seismological Model for Earthquakes Induced by Fluid Extraction from a Subsurface Reservoir"; J. Geophys. Res. Solid Earth. (2014); 25 pages.

Bowman et al.; "Determining Effective Hydraulic Fracture Volume Utilizing PSO and Seismic Deformation"; Frontiers + Innovation; (2009); CSPG CSEG CWLS Convention; 2 pages.

Notification of Transmittal of the International Search Report and the Written Opinion of the International Searching Authority, or the Declaration; PCT/US2015/061203; Mailing Date Jan. 28, 2016, 7 pages.

Shaprio, et al.; "Large-Scale in Situ Permeability Tensor of Rocks from Induced Microseismicity; Geophysical Journal International", (1999); 7 pages.

Shemeta, et al.; "It's a Matter of Size: Magnitude and Moment Estimates for Microseisraic Data"; The Leading Edge; (2010); 6 pages.

Vasco, et al.; "Estimating Permeability from Quasi-Static Deformation; Temporal Variations and Arrival-Time Inversion"; Geophys. vol. 3, No. 6, Nov.-Dec. 2008; 16 pages.

* cited by examiner

GENERATION OF FRACTURE NETWORKS USING SEISMIC DATA

BACKGROUND

Hydrocarbons are typically recovered by having hydrocarbons flow out of reservoirs in a formation and into a borehole that penetrates the formation. Hydraulic fracturing and other stimulation techniques may be applied to the formation to facilitate removal of hydrocarbons by fracturing the formation and/or extending existing fractures in the formation. In order to effectively manage such operations and assess formation fractures, fracture network models may be constructed to estimate the distribution of fractures in the formation.

SUMMARY

An embodiment of a method for constructing a fracture network includes: receiving seismic data collected from a stimulation operation in an earth formation, the seismic data including seismic event data including a first seismic event associated with a first time increment and a second seismic event associated with a subsequent second time increment; and constructing a fracture network model. The model is constructed by: constructing an initial portion of the model based on the first seismic event; and subsequently updating the initial portion of the model based on the second seismic event.

An embodiment of a system constructing a fracture network includes: a carrier configured to be disposed in a borehole in an earth formation, the carrier configured to perform a stimulation operation in the earth formation; and a processor configured to perform: receiving seismic event data collected for the stimulation operation, the seismic event data including a first seismic event associated with a first time increment and a second seismic event associated with a subsequent second time increment; and constructing a fracture network model. The model is constructed by: constructing an initial portion of the model based on the first seismic event; and subsequently updating the initial portion of the model based on the second seismic event.

BRIEF DESCRIPTION OF THE DRAWINGS

The following descriptions should not be considered limiting in any way. With reference to the accompanying drawings, like elements are numbered alike.

DETAILED DESCRIPTION

There is provided a system and method for modeling fractures in an earth formation. An embodiment of a method includes correlation of fracture data with seismic data during generation of a discrete fracture network (DFN). The methods described herein integrate seismic date (e.g., microseismic event data) in the creation of a fracture network model such as a DFN model.

Embodiments of methods and algorithms prescribe an automated, rule-based construction of a DFN network based on a temporal sequence of measured microseismic events. At each time increment or time value for which a microseismic event is identified, the DFN is constructed and/or updated incrementally based on the assumption that the event is caused by a propagating fluid front, where new events lie on an already captured fracture or a on a fracture not yet captured but connected to the network. Based on the location of the new event, an already captured fracture may be modified or a new fracture may be added to the network from predefined sets.

Population of fractures in the DFN is rule based and may be determined by various weights and rules, which can be combined with uncertainties for multiple realizations. The number and complexity of rules and weights may be flexible so that the network can be built based on a variety of different data sets.

Figure 1:
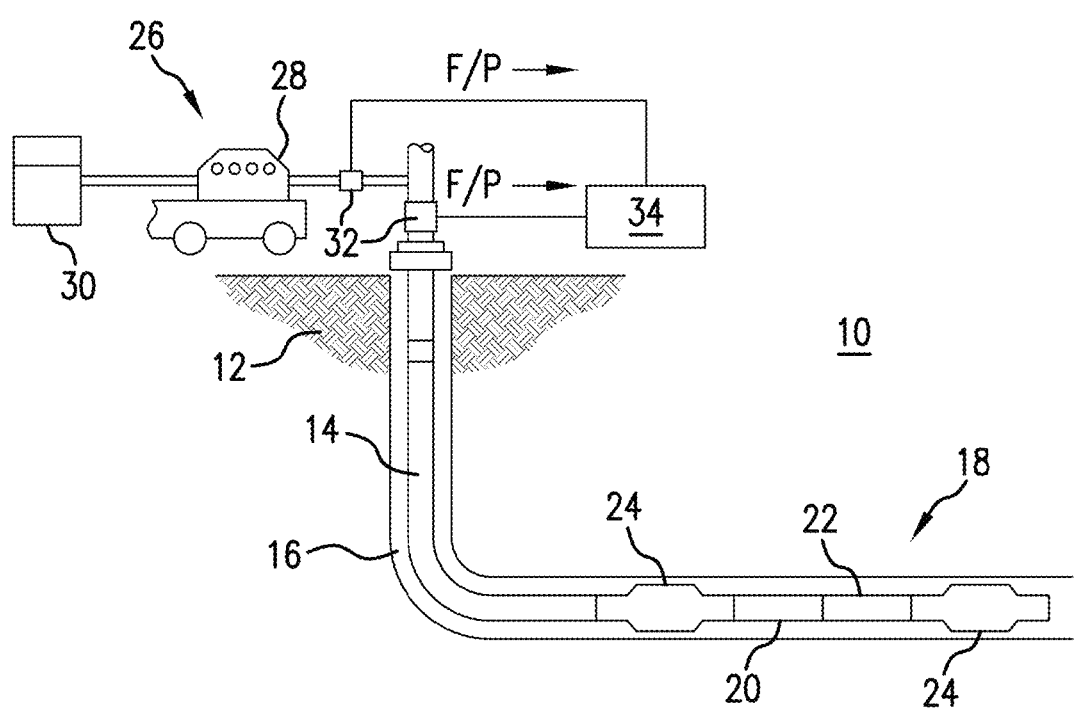
FIG. 1 depicts an embodiment of an earth formation stimulation system.

FIG. 1 illustrates aspects of an exemplary embodiment of a system 10 for hydrocarbon production, stimulation and/or measurement of an earth formation 12. The system 10 includes a borehole tubing 14 or other structure or carrier disposed within a borehole 16 that is suitable for lowering a tool or other component through a borehole or connecting a component to the surface. The term "carrier" as used herein means any device, device component, combination of devices, media and/or member that may be used to convey, house, support or otherwise facilitate the use of another device, device component, combination of devices, media and/or member. Exemplary non-limiting carriers include casing pipes, wirelines, wireline sondes, slickline sondes, drop shots, downhole subs, BHA's, frac ports and drill strings.

In one embodiment, the system 10 is configured as a hydraulic stimulation system. As described herein, "stimulation" may include any injection of a fluid into a formation. An exemplary stimulation system may be configured as a cased or open hole system for stimulating existing fractures in the formation by, e.g., opening, widening and/or offsetting existing fractures.

A fluid may be any flowable substance such as a liquid or a gas, and/or a flowable solid such as sand. In this embodiment, the string 14 includes a stimulation assembly 18 that includes one or more tools or components to facilitate stimulation of the formation 12. For example, the string 14 includes a stimulation device 20 including, e.g., injection nozzles and mechanical valve devices such as frac sleeves and/or drop-ball devices, and optional sensor and/or electronics assemblies 22. The string may also include additional components, such as one or more isolation or packer subs 24. In the embodiment shown in FIG. 1, the system is configured to stimulate existing fractures, but is not so limited. The system may be configured to perform various functions, such as initiating new fractures via fracturing and/or facilitating production.

One or more of the stimulation assembly 18, the fracturing assembly 20, the perforation assembly 22 and/or packer subs 24 may include suitable electronics or processors configured to communicate with a surface processing unit and/or control the respective component or assembly.

An injection system 26 includes an injection device such as a high pressure pump 28 in fluid communication with a fluid tank 30 or other fluid source. The pump 28 injects fluid into the string 14 to introduce fluid into the formation 12, for example, to stimulate and/or fracture the formation 12.

One or more flow rate and/or pressure sensors 32 may be disposed in fluid communication with the pump 28 and the string 14. The sensors 32 may be positioned at any suitable location, such as proximate to or within the pump 28, at or near the wellhead. The types of sensors described herein are exemplary, as various types of sensors may be used to measure various parameters.

A processing and/or control unit 34 is disposed in operable communication with the sensors 32 and the pump 28. The processing and/or control unit 34 is configured to receive, store and/or transmit data generated from the sensors 32 and/or the pump 28, and includes processing components configured to analyze data and/or control operational parameters. The processing and/or control unit 34 includes any number of suitable components, such as processors, memory, communication devices and power sources.

Figure 2:
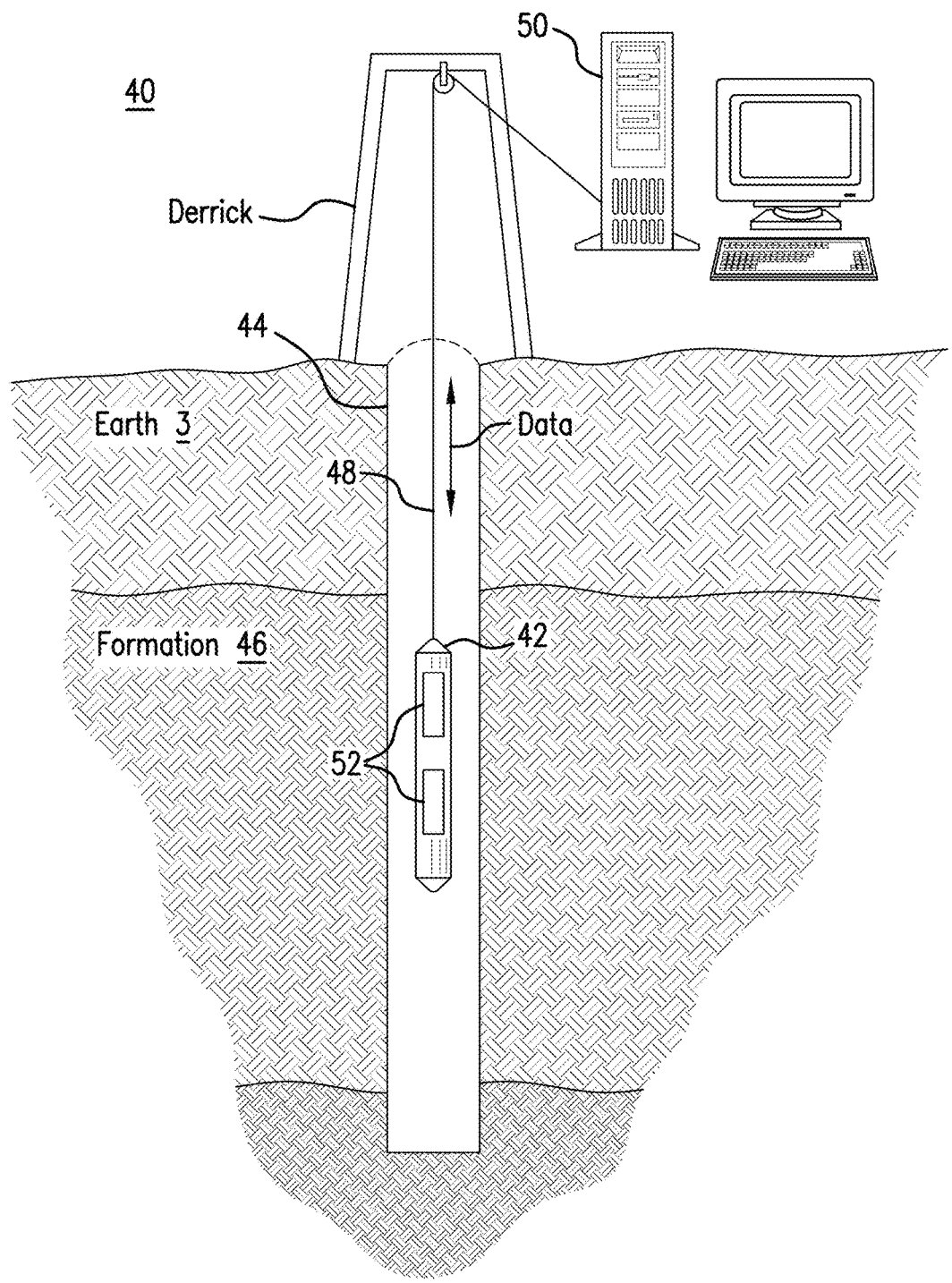
FIG. 2 depicts an embodiment of a system for monitoring seismic activity in a formation.

FIG. 2 illustrates an embodiment of a measurement and/or monitoring system 40. The system 40 includes a data acquisition tool 42 disposed in a borehole 44 in a formation 46. The data acquisition tool 40 is configured to monitor and/or collect data related to stimulation operations, such as those performed via the system 10. The tool 40 may be deployed downhole via any suitable carrier as shown in FIG. 2, may be disposed at a surface (e.g., as part of a surface seismic array), and/or configured to operate in conjunction with other downhole or surface tools. In the embodiment shown in FIG. 2, the carrier is an armored wireline 48, which provides support for the tool 42 and also provides communications between the downhole tool 10 and a surface processing unit 50.

In one embodiment, the tool 42 or a plurality of tools 42 are disposed in the borehole 44 that is located within the same formation as the borehole 16 and the fracturing system string 14 and/or is located sufficiently close to the borehole 16 and the formation 12 so as to receive signals produced by the fracturing operation. In other embodiments, the tool(s) 42 are disposed in the same borehole as the fracturing system, e.g., incorporated as part of the string 14. In another embodiment, the tool 42 is embodied as one or more surface sensing tools.

In one embodiment, the tool 42 and/or the system 40 is configured for seismic monitoring of the formation 12 during a fracturing operation. The tool 42 includes one or more seismic receivers 52. The receivers may be positioned along a separate borehole relative to the fracturing borehole (e.g., arrayed in the borehole 44), disposed in the fracturing borehole (e.g., as part of the string 14) and/or deployed at one or more surface locations. For example, each receiver 52 is a geophone and/or a hydrophone.

The tools 42 and/or seismic receivers 52 are connected to a suitable processing device or system such as the surface processing unit 50 and/or the processing unit 34. The processing device includes components sufficient to allow the processing device to receive and analyze data. Analysis may include processing seismic data and any other data received via measurements taken prior to, during and/or after the fracturing process. An analysis example includes constructing a model of natural fractures in the formation 12 and fractures in the formation 12 created by the fracturing process. The processing device includes, for example, a power supply, input/output components, one or more processors, a memory device or system, telemetry components and/or one or more displays.

In one embodiment, the seismic receivers 52 are passive seismic receivers. The receivers may be configured to perform seismic surveys such as passive or "microseismic" surveys, which generally include receiving data from a receiver, locating data that exceeds some threshold, and analyzing the over-threshold data in order to determine information about certain events.

Microseismic surveying or monitoring concerns passively monitoring a formation for seismic events. In passive monitoring, the formation is not interrogated, per se, but seismic receivers are placed to receive directly any seismic waves generated by events occurring within the formation. Such events may include the seismic effects generated in a formation by fracturing, depletion, flooding, treatment, fault movement, collapse or other subterranean interventions or effects. For example, during a fracture operation, fluid and propant is pumped down a borehole at high pressure in order to generate additional fracturing within a formation zone. The propant is pumped into these fractures and maintains them after the pressure is removed. The receivers monitor seismic waves generated during and immediately after the fracture operation to provide information such as the direction, location and extent of the fractures being generated.

In one embodiment, a processing device such as the processing unit 50, which may include one or more processors, is configured to generate a model of the fracture network based on collected fracture data and based on microseismic data collected during a fracture operation by, e.g., the receivers 52.

An example of a fracture network model is a discrete fracture network (DFN) model. The DFN model is typically two- or three-dimensional. DFN models are constrained by fracture data obtained from different data sources such as image logs or outcrop analogues. The fracture data is used to describe fracture sets with respect to various properties, such as orientation in space, geometry, spacing and aperture. For three-dimensional networks, one- or two-dimensional fracture parameters are typically linked to a three-dimensional attribute or property such as curvature, shale content, bedding thickness, fault proximity and others. Conventional DFN models are built stochastically based on these relationships.

The DFN model is typically constrained by correlations of one or more model parameters with the fracture parameters. Fractures identified by the fracture data are grouped into fracture sets. A "fracture set" is a group of fractures having common or similar parameters, such as orientation, and density. Each fracture set is defined based on parameters derived from the fracture data and based on other model parameters. For example, a fracture set is typically defined by groups of fractures having the same or similar orientation in space (the size, density and/or aperture may vary within the set).

The orientation may be described by the dip angle and the dip azimuth, and can be measured, for example, in-situ on an image log. The size is typically described by giving the fracture length and height. Size or geometric parameters such as length can be limited in some cases by cross-cutting relations, e.g., when a fracture sets terminates or abuts against an earlier fracture set. In addition, model parameters such as bedding dimensions may limit parameters such as the height of fractures. Next to these relative rules the absolute size of an isolated fracture may be described by statistical means. This may include fractal distributions, power law distributions or a simple Gaussian scatter around a mean size.

The fracture aperture may control the transmissibility and permeability of the geological system, and primarily determines the flow properties of a fracture. The aperture can be measured in the field and can also be constrained on image logs. In most instances, the aperture can be related to fracture size and/or fracture orientation in respect to the stress field. Aperture can potentially be estimated, for example, via in-situ measurements and/or outcrop measurements. Typically, the fracture aperture size is linked to the geometric size of the fractures by an empirical correlation.

The fracture density is a measure of the abundance of certain types of fractures. This parameter can be expressed by a mean spacing or by testing the fracture area per unit volume. Depending on the fracture set, the density distribution can be very different. For example, fracture density can be constant (e.g., in the case of a systematic joint set) or heterogeneous (e.g., due to localized strain). The proximity to faults or folds typically increases the fracture density leading to fracture corridors and therefore a local clustering.

Seismic or microseismic event data sets are in contrast to fracture data that is typically used in stochastic generation of DFNs. "Fracture data" refers to any measurement data or information, other than the seismic data, that is used to construct the DFN model. Although the seismic data is based on a series of interpretation steps and on different processing steps, the event data resembles measurements in time and space with an associated uncertainty. Within a microseismic data set, seismic events are identified, each of which may have various properties such as spatial location, time, magnitude and moment tensor.

A seismic event typically can be associated with a location in space. The location may come with an uncertainty based on, e.g., the accuracy of a velocity model and the precision of signal detection in time. Seismic or microseismic events are collected over time and associated with a time value or increment within the total time duration of a fracture operation and for some duration after the operation. Timing and location combined may reveal the evolution of the system if interpreted well, and the magnitude of an event can be used as a measure of the corresponding rupture area.

In some cases, moment tensor data, which provides information on the rupture direction, is available for individual events. Moment tensor data can be used to interpret the movement associated with a microseismic event, such as shear movement and direction, as well as to determine whether the event is associated with fracture closing or fracture opening. The data of the tensor allows an eigen-direction analysis to determine the principle direction of the tensor. This can be used to constrain the orientation of a fracture associated with the event. Decomposition of the tensor also allows characterizing and quantifying the fracture modes, e.g., describing relative shear and opening components. The information derived from the tensor can therefore describe the fracture direction and potential fracture behavior.

For example, individual seismic events are defined by spatial location and time. Seismic event magnitude may be available and used in defining the events. Moment tensor information, if available, can optionally be used in incrementally constructing and/or updating the DFN as described herein.

In one embodiment, the processing device is configured to integrate seismic data (e.g., microseismic event data) collected for a fracturing operation or stimulation into the creation of a DFN network. The processing device implements a method that uses the temporal development of seismic events indicated by microseismic data in constructing a fracture network model such as a DFN model. Using the microseismic data for the initial creation of the DFN model allows for integration of microseismic data points with the DFN model.

Figure 3:
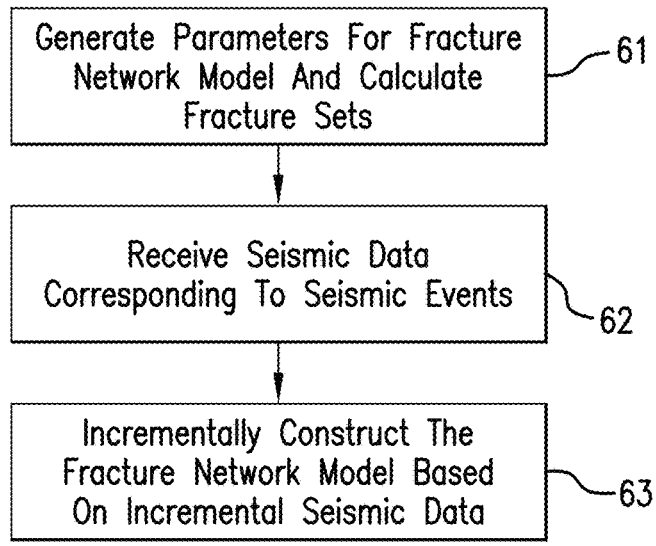
FIG. 3 is a flow chart illustrating an embodiment of a method of constructing a fracture network model.

FIG. 3 illustrates a method 60 for constructing or generating a model of a fracture network. The method 60 includes one or more stages 61-63. The method 60 is described herein in conjunction with a processor that receives seismic signal data related to a fracturing operation. For example, the method 60 is performed by a processor (e.g., the processing unit 50) that receives microseismic data from a seismic measurement system such as the system 40. In one embodiment, the stages 61-63 are performed in the order described, although some steps may be performed in a different order or one or more steps may be omitted.

In one embodiment, the method 60 is performed as specified by an algorithm that allows a processor to automatically generate a fracture network model such as a DFN model. The processor as described herein may be a single processor or multiple processors (e.g., a network).

In the first stage 61, parameters are selected and/or collected for the DFN to be built. Such parameters include the number of fracture sets with information on their density, orientation as well as other parameters. The parameters may be based on data collected for the formation prior to fracturing. Exemplary data includes fracture data collected from image logs or outcrops. The parameters of each fracture set (also referred to as rules) are established to govern the construction of the DFN. For example, a first set of data is used as an input into the model/algorithm. The first fracture set derived from the first set of data describes the allowable parameters (orientation, density, etc.). These sets may be defined by a user as input populations. A fracture set describes fractures with a common orientation (or other common parameter value or range of values) which are typically formed in the same geological event. The fractures of one group typically hold common characteristics in respect to geometry (height/length, aperture), length, etc.

For example, collected fracture data is separated into distinct fracture sets based on fracture orientation and/or other parameters (e.g., height, length and aperture). This can be performed, for example, based on lower hemisphere plots. From such plots, orientation information such as the dip angle, dip azimuth and associated variabilities can be determined.

For each fracture set, various parameters may be determined that govern the parameters of available fractures that can be added during construction of a DFN model. For example, the mean orientation and variability is calculated for each fracture set. These values determine the allowable orientation of fractures which can be added to the network. Multiple realizations (i.e., multiple fractures selected that could be added for a given location) can be obtained by including the variability of the orientation parameter.

Exemplary parameters for a fracture set include orientation parameters such as azimuth, dip, cross cutting and geomechanical parameters. Azimuth and dip parameters for a set may be calculated based on the mean value and a variation value (e.g., standard deviation), and geomechanical parameters may be based on the orientation of fractures in the set relative to the stress field. Azimuth, dip and geomechanical orientation may be used to realize a fracture constructed in the DFN.

Other parameters include geometry parameters that define or confine the fracture geometry (e.g., length, height and length/height ratios) as well as the spacing or density. Length, height and aperture are calculated for a set and can be used as values to realize a fracture added to the DFN. In one example, the allowable length for a fracture can be set up with a probability density function (PDF). The height may be based on a PDF or a ratio to the length. A PDF can be used to implement the uncertainty in geometric parameters, which can be used for multiple realizations of a fracture. For example, a dynamic length/height relationship as well as a PDF for the fracture length may be used. The length may be limited by cross-cutting relationships, and the height may be limited by cross-cutting relationships or limited to certain layers. The aperture can be set to correlate with length and/or height.

Geometric parameters such as the fracture height/length ratio may be linked to other rules. Other rules include, e.g., rules for confining the fracture of a fracture set to a certain layer or implementing cross-cutting relationships which prevent elongating a fracture beyond a "higher-order" set.

In addition, weighting factors (also referred to as weights) may be assigned to fracture sets to guide the selection of individual fractures for addition to the network. For example, the fracture orientation of a fracture set with respect to the current stress field may determine how likely it is to activate a set. Critically stressed fractures or those which are normal to the minimum principle stress can be favored. In another example, the length and/or the height of a fracture set can be used as a weight in determining which fracture set to use. The PDF of the length and/or height may be used as a weight in deciding which fracture to add to the network. Geomechanical parameters, such as stress magnitudes and orientations, may also be used as a weight in determining which set is to be selected for addition of a fracture.

In the second stage 62, microseismic data is received. Any number of data points may be received, each of which has a temporal component that is expected to correspond with stimulation fluid causing a change in the formation fracture network by the stimulation, e.g., by opening, offsetting or closing existing fractures as well elongating existing fractures. Stimulation, in one embodiment, includes stimulating existing fractures, but may also include forming new fractures. The microseismic data points may be described as a "cloud" showing the spatial locations of each event relative to the borehole position. Each event is associated with a time value or increment, and is assigned to a frac stage if more than one frac stage is considered. For example, in addition to inputting the first data set, a second data set including the seismic/microseismic events is inputted to the model/algorithm.

The microseismic data may be from a previous or current fracturing operation. For example, microseismic data can be received in real time and used to construct the DFN as it is received.

Figure 4:
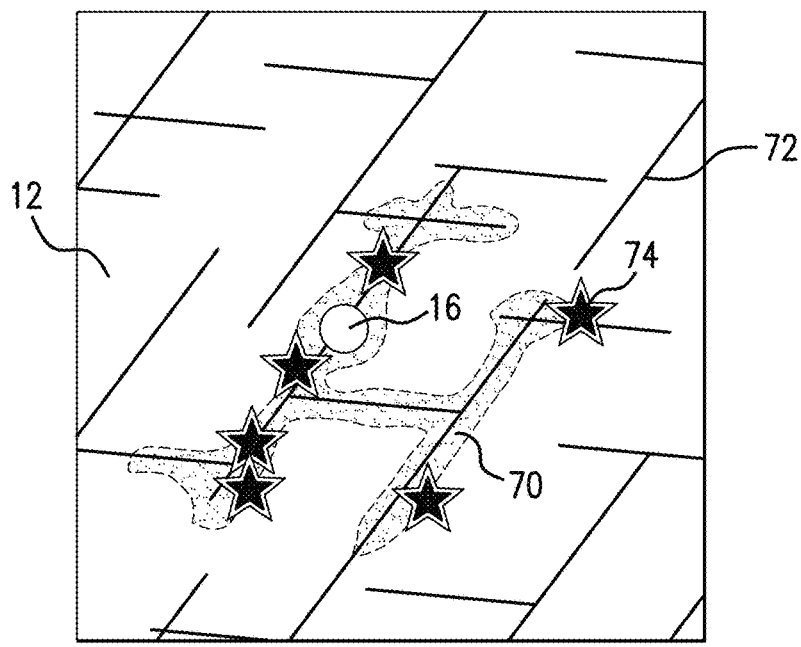
FIG. 4 illustrates a fracture network in an earth formation that is subject to hydraulic fracturing.

An example of microseismic events occurring during a fracturing operation, for which data is received, is shown in FIG. 4. During the stimulation, fluid 70 is injected from the wellbore 16 into the formation 12. As the fluid 70 is injected, it flows into pre-existing fractures 72. Microseismic events 74 are caused by the propagating fluid 70 as the fluid 70 opens and/or extends existing fractures, or creates new fractures. An assumption for the method is that an event 74 happens on a fracture at the fluid front or within the propagating fluid. In both cases, the event 74 is directly related to the fluid. The stimulated network generated by the method 60 is therefore connected to the borehole at all times.

In the third stage 63, the model is incrementally built up according to time increments associated with the microseismic events. For a plurality of time increments, starting at the first increment of a fracturing operation for which a seismic event is detected, an initial DFN portion is estimated based on the DFN parameters. This estimation includes describing the expected size, aperture and orientation of fractures at the first time increment in the absence of seismic data. The seismic event or events at the first time increment are applied to the DFN portion to update or adjust the DFN component at the first time increment. For each subsequent time increment, the DFN model that was calculated based on DFN parameters and prior events is updated by applying an associated event or events to the model. "Updating" refers to the application of a seismic event to an initial or otherwise previously constructed portion of the DFN, and may include elongating an existing fracture or adding a new fracture to the DFN based on the seismic event, as described further below. In one embodiment, the application of microseismic data and construction of the DFN model is performed incrementally for each temporally successive seismic event.

For each increment, the seismic event is analyzed relative to constructed fractures to determine how the DFN should be adjusted. In one embodiment, a seismic event associated with a current time increment is applied to the current version of the DFN model by comparing the position of the event relative to fractures constructed up to the current time increment.

In one embodiment, adjustments are performed based on the distance of the event from one or more constructed fractures. In one embodiment, the distance as described herein includes a magnitude and a direction, i.e., can be described by a distance value and a displacement vector. For example, the normal distance from the event to one or more constructed fractures is calculated. A "constructed fracture" is considered to be a modeled fracture that was previously added to the network prior to application of the current seismic event. The normal distance may be calculated for all constructed fractures, or for a subset thereof, such as fractures within a network region related to the position of the event.

This process is repeated incrementally by expanding the DFN for subsequent seismic events where appropriate. Each incremental step includes expanding or updating the DFN from the previous increment to the current increment based on the DFN parameters, and adjusting the DFN using the seismic event (e.g., magnitude and location) to adjust the DFN accordingly.

Based on the distance (and other potential factors) from an event to one or more constructed fractures, it is determined whether existing fractures in the model should be modified or whether a new fracture should be added to the model. Based on the relationship between the event and a fracture, it is determined whether and how the fracture should be modified based on the event. In one embodiment, the determination can be made according to three scenarios. In a first scenario, the event is close enough to an existing fracture so that the event can be correlated to the existing fracture. In a second scenario, the event results in an existing fracture being elongated or otherwise modified. In a third scenario, the event results in a new fracture being added to the DFN model.

In one embodiment, weights are defined that govern which of the three scenarios should be applied to a fracture based on the proximity of the event to the fracture. Each constructed fracture that is considered for this event may be assigned a weight. To weight the three different scenarios for an event, the proximity of a microseismic event to a constructed fracture is quantified and implemented as a weight. The proximity of an event to each considered fracture is collected, e.g., the normal component ("normal distance") of the distance from the event to the fracture, as well as the component of the distance that is parallel to the fracture in the fracture plane.

Figure 5:
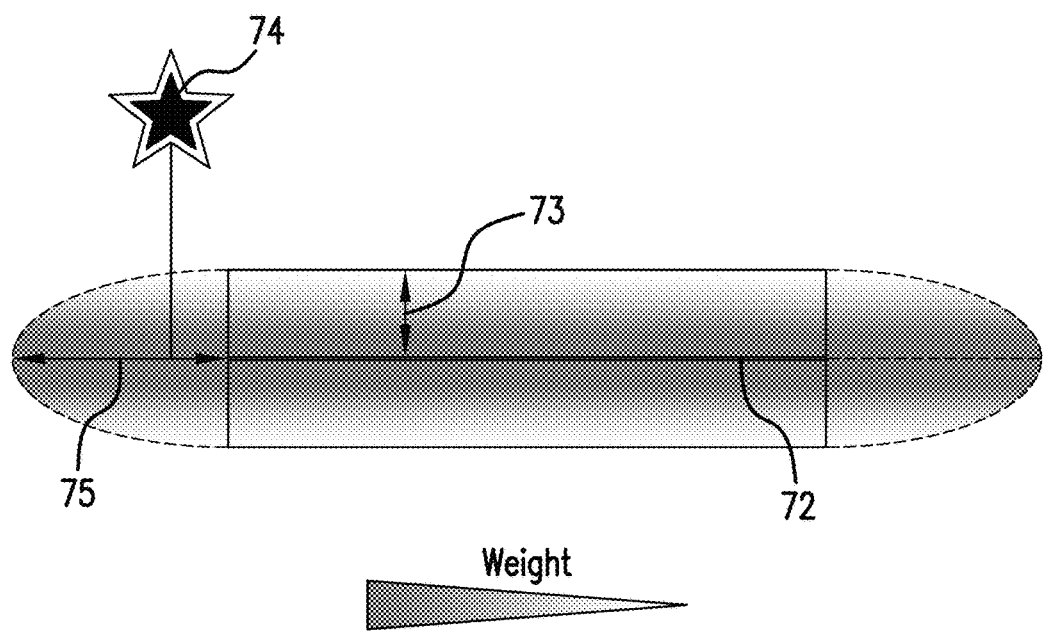
FIG. 5 depicts an example of a fracture constructed as part of a fracture network model and a seismic event.

FIG. 5 illustrates an embodiment of how weights may be used to determine whether and how to modify a constructed fracture. The event 74 is located some distance and direction from the two-dimensional fracture 72. The proximity of the event 74 (both the normal and parallel components) to the fracture 72 is calculated. A weighting value is defined that includes a normal distance range 73 limited by a selected maximum normal distance from the fracture 72. The weighting value also includes a parallel distance range 75 limited by a maximum parallel distance. Values within the normal and parallel distance ranges are assigned weights (shown by shading in FIG. 5) based on the distance. The weight assigned to the fracture 72 is defined by whether and where the normal and/or parallel distance of the event 74 falls within these ranges. The closer the event 74 is to the fracture 72, the more weight the fracture 72 gains.

Both components are then used to define a weight. If the distance from the event to the fracture is beyond a critical or maximum normal and parallel distance, a weight of zero is assigned to the fracture and the fracture is not considered. For example, if the normal distance between the event 74 and the fracture 72 falls outside the normal distance range 73 and the parallel distance falls outside the parallel distance range 75, the fracture 72 is not considered relative to the event 74. Sequential tests as well as global tests may be performed. Weighting relative to the first, second and third scenarios may be performed in any sequence.

A small normal distance in a section parallel to the fracture (e.g., the solid rectangle in FIG. 5) may imply that the event happened on the captured fracture (the first scenario). A small normal distance and a small parallel distance (e.g., the event 74 occurred within the region bounded by the broken line semi-oval region in FIG. 5) may imply that the event happened on a section of the same fracture which is not captured yet. This scenario (the second scenario) would require the fracture to be elongated.

The third scenario, in which the event is located at some distance to the captured network such that a new fracture should be added, involves a number of potential rules and weights. A primary weighting is based on the necessary connection distance. Smaller connection distances which are determined for the different available fracture sets have a larger weight. In one embodiment, a new fracture should not only be short, it should also be in line with the limits of the fracture density or within an allowable density range. A minimal spacing distance could be used as a secondary weight. The geomechanical properties of the set may also contribute as defined in the individual fracture sets.

The following exemplary selection parameters may be used in selecting a fracture to add to the DFN. A required length parameter may be based on a PDF, which may be overruled by a cross-cutting relationship to the existing fracture. The distance to fractures of the same set can be defined based on the critical fracture density and a defined minimal distance. Geomechanical parameters may also be used, e.g., orientation of the fracture in respect to the stress field. If available, the moment tensor information can be used to derive a fracture orientation, and can also be used as a weight in selecting fracture parameters.

These selection parameters may be used to determine which fractures are available, and may also be used as weights in determining which of the available fractures is best suited to be connected to the existing fracture.

As the quality and quantity of the input data can be very different, other rules may be added to the base weights specified above. If, for example, moment tensor information is available, the event's tensor solution could be decomposed to determine the contribution of the available sets to the signal. These can be used either as weights to favor a single set, or as a combination to add several fractures rather than a single fracture.

Upon completion of a fracture network model (or a portion thereof) based on the above methods, the model may be analysed to determine various characteristics or properties of the network. For example, the network can be analysed to determine characteristics such as density (spacing) and geometric characteristics such as length and height of fractures or groups of fractures in the fracture network.

Figure 6:
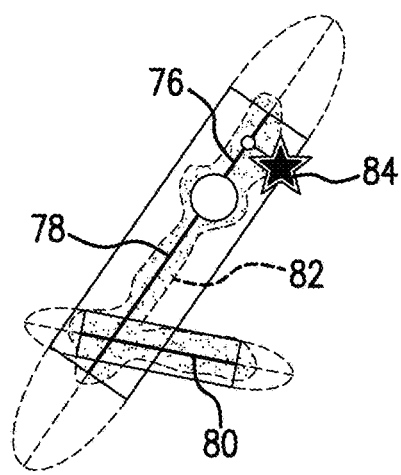
FIG. 6 depicts an example of a portion of a network fracture model and an exemplary seismic event position relative thereto.
Figure 7:
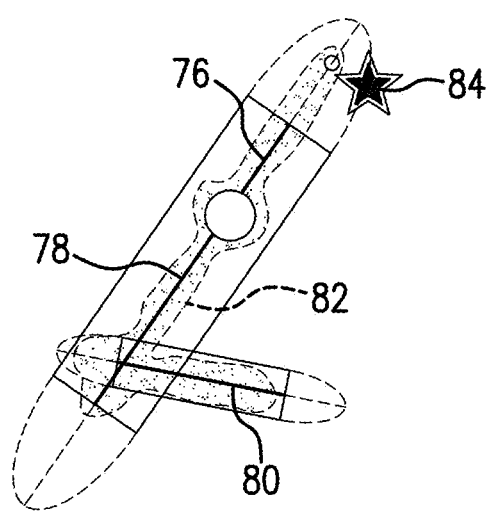
FIG. 7 depicts an example of a portion of a network fracture model and an exemplary seismic event position relative thereto.

An example of the method 60 is shown in FIGS. 6-8. In one embodiment, the fracture data is separated into distinct sets based on the fracture orientation. This separation can be performed based on statistical attributes. The orientation can be derived based on any suitable fracture orientation analyses, such as analyses based on lower hemisphere plots or rose plots when sufficient data is available. DFN parameters are selected based on the fracture set parameters and other model parameters.

Micro seismic data is collected during a stimulation operation. The data can be collected and used in the method in real time, near real time or at any time during or after the stimulation operation. In this example, the stimulation operation is performed via system 10.

According to the sequence of microseismic events, a fracture network is build incrementally. Every seismic event is interpreted to lie on a fracture plane. How the fracture plane is oriented and drawn depends on a set of parameters specified for the DFN model as described above. One condition of the model is that any added or extended fracture plane needs to be connected to the captured fracture network at the time of the event to maintain fluid connectivity.

The DFN model is built initially by drawing a portion of the fracture network according to parameters defined via the fracture sets. In this initial step, a new microseismic event is selected and applied to the initial model portion. The new microseismic event is the earliest event that has not yet been applied to the model. For example, the event may be the first event measured after the fracturing operation was commenced.

The DFN model is then incrementally updated for each of a plurality of seismic events according to the temporal progression of the events. For each time increment, one or more associated microseismic events are applied to update the DFN model. It is noted that, prior to the current update, the DFN model has been constructed according to the model parameters, and based on any events associated with an earlier time increment. In this example, assuming that an event is located on a fracture which is connected to the fluid front, application of the event may lead to one of three scenarios.

In the first scenario, the microseismic event is close to, or within a selected distance from, a captured fracture. A captured fracture refers to a fracture that has already been generated, either for the current time increment or in previous time increments. If the event is within the selected distance, it is likely that the event happened on the captured fracture.

FIG. 6 shows an example of the first scenario, in which the DFN model has been constructed up to the first time increment. The DFN model includes a fracture having fracture segments 76 and 78, and a fracture 80. The fluid propagation is represented as region 82. The fracture segments 76 and 76 are referred to as "fractures" 76 and 78.

In the first scenario, the first microseismic event 84 is related to a part of the fracture 76 which is already captured by the DFN. In this scenario, the event is determined to have occurred within the fractured section represented by the fracture 76. This scenario is determined to apply if the normal distance of the event 84 to the fracture 76 is small or within a selected distance, and there is no parallel distance away from the fracture 76 (e.g., the event 84 is within a rectangular region as exemplified in FIG. 5). The event 84 is thus estimated to have occurred in the fracture 76 behind the fluid front.

In the second scenario, the event lies within an elongation of an already captured fracture. This would correspond to a propagation of the fluid front along that fracture.

FIG. 7 shows an example of the second scenario, in which the DFN model has been constructed up to the first time increment. Elongating the captured fracture 76 in this example is sufficient to capture the new event 84. The normal distance to the fracture plane as well as the elongation distance is used to quantify the likelihood, i.e., verify whether an elongation can be considered likely. In this example, the event 84 has a normal distance within a selected range and a parallel distance with a selected range (e.g., is within the semi-oval region exemplified in FIG. 5).

When the captured fracture is elongated by an event, the fracture height can be updated while honoring a potential cross-cutting relationship. A probability density function (PDF) can be used to implement the uncertainty.

In the third scenario, the event is at a far enough distance that a new fracture is considered to be required to connect the event to the fracture network. For example, if the event is beyond a selected distance (e.g., normal distance) from any captured fractures, a new fracture is added to establish a connection with the fracture network.

Figure 8A:
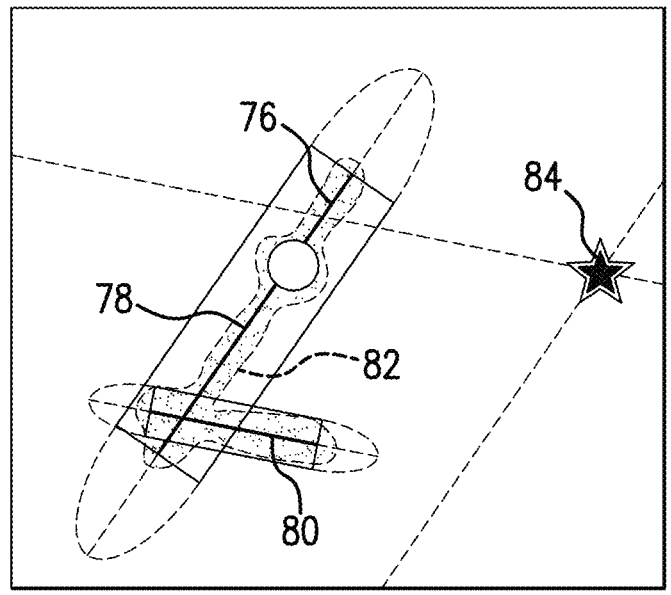
FIGS. 8A and 8B depict an example of a portion of a network fracture model and an exemplary seismic event position relative thereto.
Figure 8B:
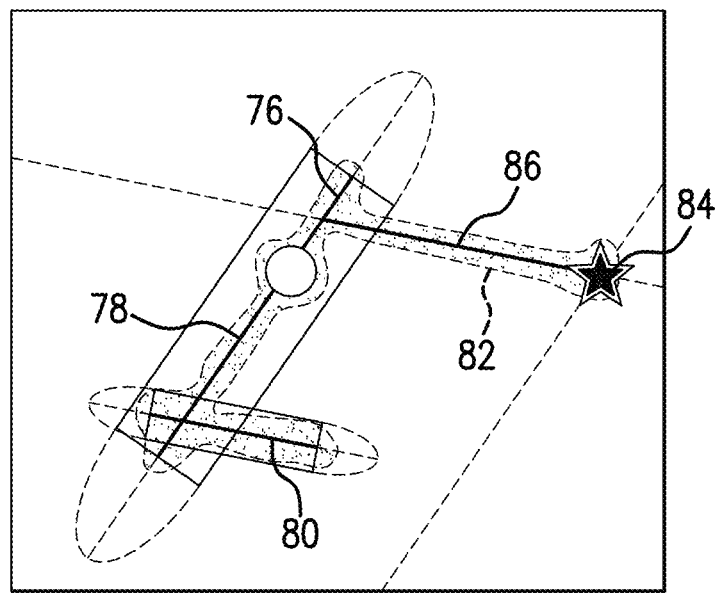

FIGS. 8A-B shows an example of the third scenario, in which the DFN model has been constructed up to the first time increment. As shown in FIG. 8A, the event 84 is beyond the selected proximity range of the already captured fractures. As shown in FIG. 8B, a new fracture 86 is added to connect the event 84 to the network. The orientations of the available fracture sets that may be added as the new fracture 84 are tested for their minimum connection distance to the event 84. The connection distances can be used as a weight to determine which of the orientations is used for the connection. The parameters of the favored set are then used to add a fracture to connect the event to the captured network.

If, for example, an event is equally far away from two possible connecting fractures in the third scenario, then the allowable fracture length may determine which of one of the fracture sets will be used to connect. If one of the fractures is likely to be too short, then the longer one will be favored. If however both fracture sets are long enough (e.g., median length is greater than connection length), then the likelihood for a connection is equally alike and other weights may be considered to determine which set will be used to establish a connection.

In one embodiment, the method 60 includes testing whether multiple events should be analyzed for placing a fracture. A population of events could be gathered either within a defined radius, or a defined time period, and/or grouped by tensor-derived directions. These subsets are then analyzed as a bulk set to determine the most likely fracture set.

Figure 9:
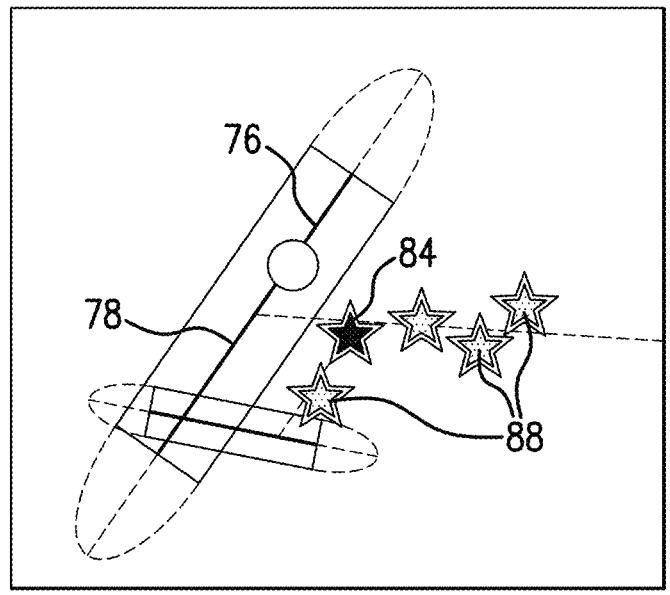
FIG. 9 depicts an example of a portion of a network fracture model and a plurality of exemplary seismic event positions relative thereto.

For example, as shown in FIG. 9, in addition to the current event 84, one or more events 88 from previous or subsequent time increments can be analyzed over a certain time period, providing a "look ahead" capability. In this example, the spatial progression of the events can provide information regarding which direction of a new fracture is more likely.

Figure 10:
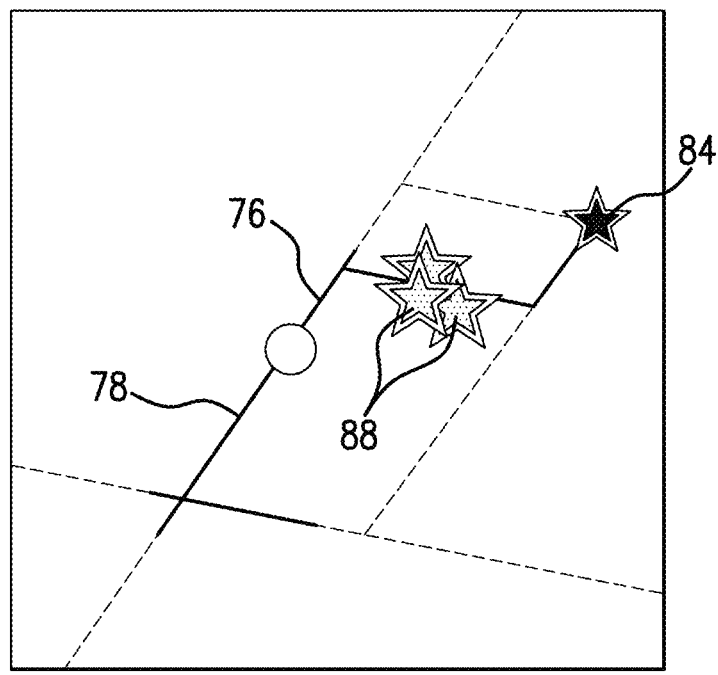
FIG. 10 depicts an example of a portion of a network fracture model and a plurality of exemplary seismic event positions relative thereto.

In cases in which the event is located in such as position that none of the sets is capable to connect the event directly to the captured network, a fracture combination may be employed. The "look ahead" capability may be used to determine possible fractures. For example, as shown in FIG. 10, the current event 84 is located at a position where none of the calculated fracture sets is capable of connecting the event 84 directly to the captured network. Later events 88 can be used to determine a possible connection.

In one embodiment, by considering variability in fracture set parameters, multiple realizations can be generated. For example, the individual weights used to distinguish the scenarios as well as pick an appropriate fracture set can be subject to a random uncertainty. Using a multiple of these "unbiased" realizations may allow a robust assessment of the fracture network parameters. In cases when the initial assumptions made on the DFN model have obvious inconsistency with the microseismic reviewed rapture geometry, the initial model assumptions can be updated through the multiple realizations to avoid the strong influence of prior information and to regain consistency between the estimated fracture network parameters and the observed microseismicity.

Although embodiments described herein include selecting fracture parameters for constructing the fracture network model based on pre-defined fracture sets, they are not so limited. In some embodiments, fractures can be added to constructed portions of the network based on criteria derived from sources that do not require fracture sets. For example, selection of a fracture for addition to a network can be based on distance from an existing fracture, e.g., by defining a fracture that connects a seismic event to the closest constructed or pre-existing fracture. Parameters of the added fracture, such as size and orientation, may be selected for the added fracture based on the fracture data described above or any other suitable information.

The systems and methods described herein provide various advantages over existing techniques to create discrete fracture models. The systems and methods provide for an accurate model of fracture networks resulting from stimulation operations. By creating a DFN model incrementally using seismic data, model parameters can be effectively fit with microseismic activity. The systems and methods provide effective techniques for integrating seismic data with fracture network model parameters, and providing a model that can be analyzed for parameters such as fracture lengths, density or spacing and relative abundance, which are difficult to constrain in-situ. In addition, the systems and methods allow for incorporating uncertainty and calculating multiple realizations to provide a robust assessment of fracture networks.

Generally, some of the teachings herein are reduced to an algorithm that is stored on machine-readable media. The algorithm is implemented by a computer or processor such as the processing unit 34 and/or 50 and provides operators with desired output.

In support of the teachings herein, various analysis components may be used, including digital and/or analog systems. The devices, systems and methods described herein may be implemented in software, firmware, hardware or any combination thereof. The devices may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the devices and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure. The computer executable instructions may be included as part of a computer system or provided separately.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for constructing a fracture network, the method comprising:
receiving seismic data collected from a stimulation operation in an earth formation, the stimulation operation including injection of fluid into the formation, the seismic data including seismic event data including a first seismic event associated with a first time increment and a second seismic event associated with a subsequent second time increment; and
constructing a fracture network model by:
constructing an initial portion of the model based on the first seismic event, the initial portion representing a fracture network including a fracture constructed based on the first seismic event;
estimating a location of the second seismic event; and
subsequently updating the initial portion of the model based on the second seismic event based on an assumption that the first seismic event and the second seismic event occur within propagating fluid or at a propagating fluid front, wherein updating includes estimating a distance between the location and the constructed fracture, and performing one of:
elongating the constructed fracture by extending a length of the constructed fracture based on a normal component of the distance being within a selected distance range; and
selecting a new fracture and connecting the new fracture to the constructed fracture based on the normal component of the distance exceeding the selected distance range the new fracture having an orientation that is different than the constructed fracture.

2. The method of claim 1, further comprising receiving fracture data for the earth formation, constructing the initial portion on the fracture data and the first seismic event, and subsequently updating the initial portion based on the second seismic event and the fracture data.

3. The method of claim 1, wherein the seismic event data includes additional seismic events, each of the additional seismic events having an associated time increment, and constructing the fracture network model includes incrementally updating the fracture network model by successively applying each additional seismic event according to the temporal progression of the additional seismic events.

4. The method of claim 1, wherein constructing the fracture network model includes, for each time increment, comparing a distance between an associated seismic event and a constructed fracture in the fracture network model and updating the fracture network model based on the comparison.

5. The method of claim 4, wherein updating the fracture network includes:
based on the normal component of the distance being within a selected normal distance range, associating the associated seismic event with the constructed fracture;
based on the normal component being within the selected normal distance range and a parallel component of the distance being within a selected parallel distance range, elongating the constructed fracture; and
based on the normal component exceeding the selected normal distance range and the parallel component exceeding the selected parallel distance range, adding the new fracture to connect the associated seismic event to the constructed fracture.

6. The method of claim 5, wherein the fracture network model is a discrete fracture network (DFN) model, and adding the new fracture includes selecting parameters for the new fracture from a fracture set obtained from fracture data received for the earth formation.

7. The method of claim 5, wherein the fracture network model is a discrete fracture network (DFN) model, adding the new fracture includes selecting a fracture from a plurality of fracture sets defining fracture parameters, the plurality of fracture sets obtained from fracture data received for the earth formation, and selecting the fracture includes setting a weight for each fracture set based on at least one of geomechanical parameters and moment tensor information.

8. The method of claim 6, wherein adding the new fracture includes selecting an orientation parameter from one of a plurality of fracture sets, and selecting additional parameters based on an uncertainty range of geometric parameters and a range of density parameters.

9. The method of claim 8, further comprising analysing the constructed model to estimate characteristics of an associated fracture network including at least one of density and geometric characteristics.

10. The method of claim 5, wherein adding the new fracture includes selecting an orientation of the new fracture based on a location of the associated seismic event relative to an additional seismic event having a time increment that is different than the time increment of the associated seismic event.

11. The method of claim 1, wherein the fracture network model is a discrete fracture network (DFN) model including a plurality of fractures placed based on the fracture data and the seismic data.

12. The method of claim 1, wherein constructing the initial portion of the model includes constructing a plurality of fractures based on the fracture data and subsequently updating one of the plurality of fractures based on a location of the first seismic event, and updating the initial portion of the model includes updating a fracture in the initial portion of the model based on a location of the second seismic event.

13. The method of claim 1, wherein the seismic event data is microseismic event data collected by passively monitoring seismic signals generated by the stimulation operation.

14. A system for constructing a fracture network, the system comprising:
a carrier configured to be disposed in a borehole in an earth formation, the carrier configured to perform a stimulation operation in the earth formation the stimulation operation including injection of fluid into the formation;
estimating a location of the second seismic event; and
a processor configured to perform:
receiving seismic event data collected for the stimulation operation, the seismic event data including a first seismic event associated with a first time increment and a second seismic event associated with a subsequent second time increment;
constructing a fracture network model by:
constructing an initial portion of the model based on the first seismic event, the initial portion representing a fracture network including a fracture constructed based on the first seismic event; and
subsequently updating the initial portion of the model based on the second seismic event based on an assumption that the first seismic event and the second seismic event occur within propagating fluid or at a propagating fluid front, wherein updating includes estimating a distance between the location and the constructed fracture, and performing one of:
elongating the constructed fracture by extending a length of the constructed fracture based on a normal component of the distance being within a selected distance range; and
selecting a new fracture and connecting the new fracture to the constructed fracture based on the normal component of the distance exceeding the selected distance range the new fracture having an orientation that is different than the constructed fracture.

15. The system of claim 14, wherein the seismic event data includes additional seismic events, each of the additional seismic events having an associated time increment, and constructing the fracture network model includes incrementally updating the fracture network model by successively applying each additional seismic event according to the temporal progression of the additional seismic events.

16. The system of claim 14, wherein constructing the fracture network model includes, for each time increment, comparing a distance between an associated seismic event and a constructed fracture in the fracture network model and updating the fracture network model based on the comparison.

17. The system of claim 16, wherein updating the fracture network includes:
based on the normal component of the distance being within a selected normal distance range, associating the associated seismic event with the constructed fracture;
based on the normal component being within the selected normal distance range and a parallel component of the distance being within a selected parallel distance range, elongating the constructed fracture; and
based on the normal component exceeding the selected normal distance range and the parallel component exceeding the selected parallel distance range, adding the new fracture to connect the associated seismic event to the constructed fracture.

18. The system of claim 17, wherein the fracture network model is a discrete fracture network (DFN) model, and adding the new fracture includes selecting parameters for the new fracture from a fracture set obtained from fracture data received for a stimulation operation.

19. The system of claim 14, wherein the processor is configured to receive fracture data for an earth formation, construct the initial portion based on the fracture data and the first seismic event, and subsequently update the initial portion based on the fracture data and the second seismic event.

* * * * *